Oct. 25, 1932.   W. BARCLAY   1,884,513
RAMP
Filed June 9, 1931
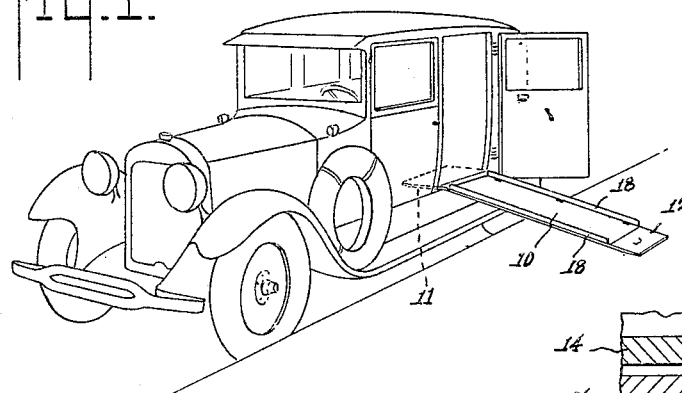
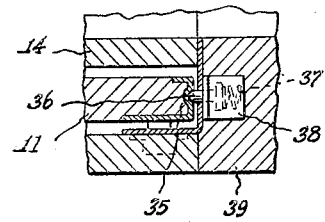
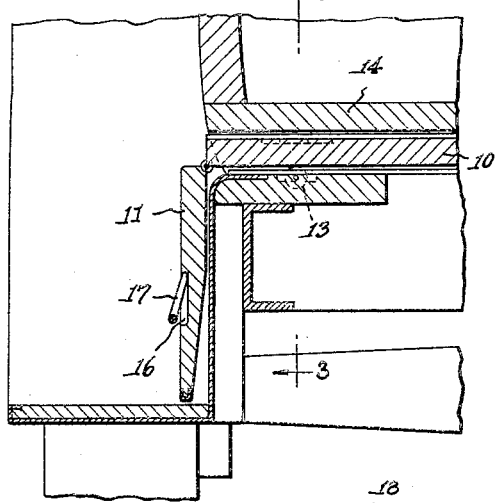
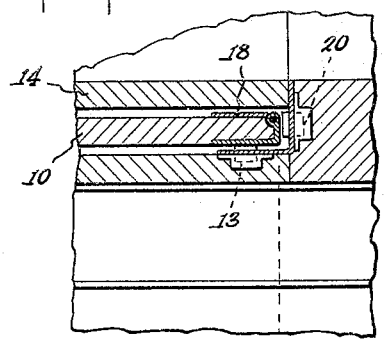
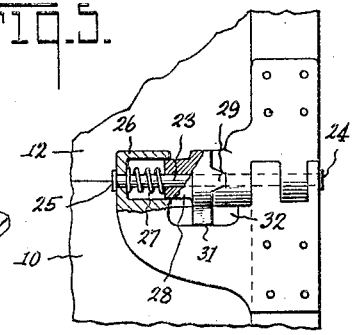
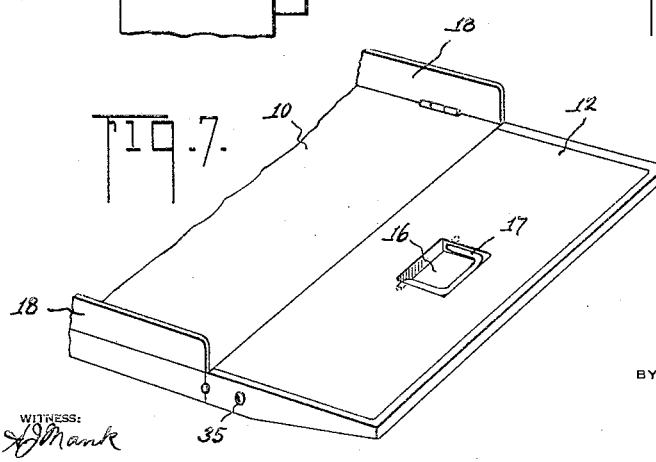
WRIGHT BARCLAY
INVENTOR Patented Oct. 25, 1932

1,884,513

UNITED STATES PATENT OFFICE

WRIGHT BARCLAY, OF NEW YORK, N. Y.

RAMP

Application filed June 9, 1931. Serial No. 543,182.

This invention relates to ramps for automobiles and it has for one of its objects the provision of a ramp adapted to be carried by an automobile under the floor thereof when not in use and slidable from under the floor when in use, the ramp being provided with extensions at each end, said ramp, by virtue of the mentioned extensions, being of such length that the slope or inclination thereof, when in use, will not be steep but gentle enough to provide easy rolling of a wheel chair on the same into and out of an automobile.

The ramp hereinafter described is intended to be used as a means for getting a wheel chair into or out of an automobile and is adapted to be pulled outwardly from either side of the automobile from its retracted position.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claims.

In the drawing:

Fig. 1 is a perspective view of an automobile and my improved ramp.

Fig. 2 is a fragmentary vertical section of an automobile body and the ramp, the latter being shown in the position it occupies when not in use.
Fig. 3 is a vertical section taken on line 3—3 of Fig. 2, looking in the direction of the arrows.

Fig. 4 is a fragmentary vertical section of parts of the automobile body and part of the ramp.

Fig. 5 is a fragmentary bottom plan view of the main section of the ramp and an extension therefor showing the hinged connection of the two.

Fig. 6 is a perspective view of a member shown in Fig. 5; and

Fig. 7 is a fragmentary perspective view of an end portion of the ramp when the ramp is in extended position.

Referring to the drawing for a more detailed description thereof, the ramp comprises a main or middle section 10 and end sections 11 and 12 pivoted to the ends of the main section. When the ramp is not in use it lies on rollers 13 below the floor 14 of the car and the end sections 11 and 12 are at right angles to the main section in a vertical position, as illustrated in Fig. 2. The end sections are provided with depressions 16 at their upper surfaces in order to allow handles 17 to lie in said depressions flush with the upper surface of said extensions, said handles being pivotally mounted on said extensions.

The main or middle section 10 is provided at its sides with flanges 18 hinged to the mentioned main section, said flanges being adapted to stand upright and to be turned over so that they lie on the upper surface of the mentioned main section, it being understood that the flanges are in upright position when the ramp is in use and in turned down position when the ramp is not in use and lies under the floor of the car. It will also be understood that the mentioned flanges function as guards to prevent a wheel chair from falling off the sides of the ramp. In addition to the bottom rollers 13, side rollers 20 are provided so that the ramp may be easily slid into or out of position.

The extensions or end sections 11 and 12 are each pivotally connected to the main or middle section 10 by means of a pair of hinges 22, said hinges comprising pins 23 connecting the members of the hinges together. Said pins extend inwardly beyond the mentioned hinges, are provided with outer retaining heads 24 which abut against the sides of the ramp, and inner retaining heads 25 which abut against the ends of members 26. Helical coils 27 encircle the inner end portions of the pins 23 and are adapted to press members 28 against the hinges 22, said members 28 having lugs 29 extending from their outer ends and positioned in depressions formed on the inner sides of the hinges to hold the mentioned extensions in extended position, it being understood that when the extensions are bent at right angles to the main section 10, the lugs 29 are forced out of the mentioned depressions, this being possible on account of the resiliency of the mentioned springs. The member 28 is provided with a tongue 31, said tongue being disposed in a slot 32 in the main section 10 to prevent the member 28 from turning.

The ramp may be pulled from retracted to extended position from either side of the automobile and the ramp, when in extended position, is retained or held to the automobile by one of the mentioned extensions, the other extension and the middle section 10 forming the effective part of the ramp or that part on which the wheel chair rolls. In order to hold the retaining extension to the automobile, said extensions are provided at their sides with depressions 35 to receive the ends of pins 36, which are pressed into said depressions by means of coiled springs 37 positioned in recesses 38, formed in members 39.

What is claimed as new is:

1. A ramp comprising a plurality of sections, interfitted hinged leaves carried by the respective sections, pintles connecting the interfitted leaves, a clutch head fast with one leaf, a clutch sleeve slidable on the pintle, held against rotation by the other leaf and engaging the clutch head, and a spring urging the sleeve toward the clutch head.

2. A ramp comprising a plurality of sections, interfitted hinged leaves carried by the respective sections, pintles connecting the interfitted leaves, a clutch head fast with one leaf, a clutch sleeve slidable on the pintle, held against rotation by the other leaf and engaging the clutch head, a spring urg'ng the sleeve toward the clutch head, and foldable side extensions on one section.

3. A ramp comprising a plurality of sections, interfitted hinged leaves carried by the respective sections, pintles connecting the interfitted leaves, a clutch head fast with one leaf, a clutch sleeve slidable on the pintle, held against rotation by the other leaf and engaging the clutch head, a spring urging the sleeve toward the clutch head, foldable side extensions on one section, and means for adjustably latching the ramp to an automobile body.

In testimony whereof I hereby affix my signature.

WRIGHT BARCLAY.